Patented June 10, 1924.

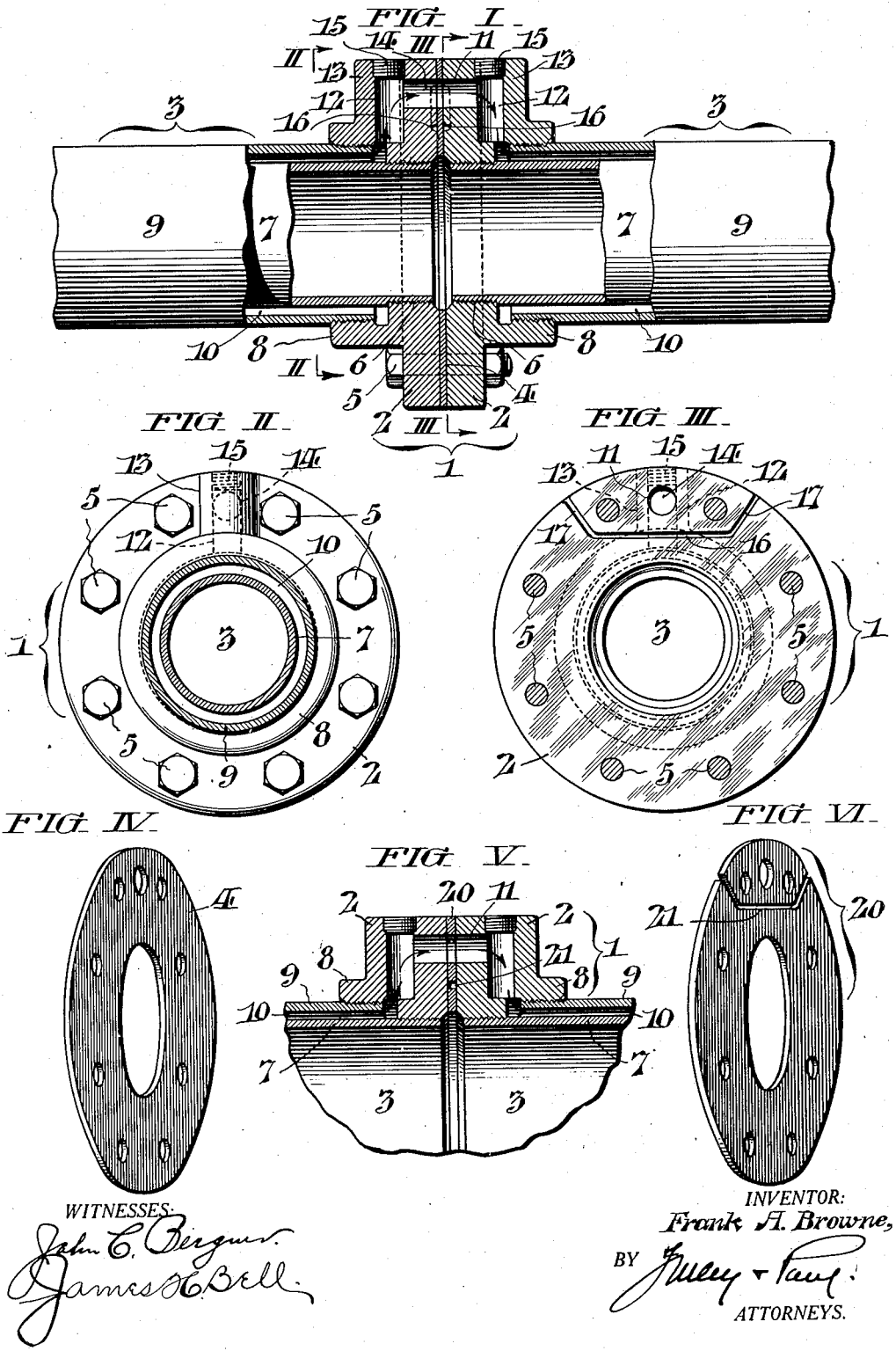

1,497,652

UNITED STATES PATENT OFFICE.

FRANK A. BROWNE, OF WAYNE, PENNSYLVANIA, ASSIGNOR TO THE BARBER ASPHALT COMPANY, OF PHILADELPHIA, PENNSYLVANIA, A CORPORATION OF WEST VIRGINIA.

COUPLING FOR JACKETED CONDUIT SYSTEMS.

Application filed November 12, 1921. Serial No. 514,785.

*To all whom it may concern:*

Be it known that I, FRANK A. BROWNE, a citizen of the United States, residing at Wayne, county of Delaware, and State of Pennsylvania, have invented certain new and useful Improvements in Couplings for Jacketed Conduit Systems, of which the following is a specification, reference being had to the accompanying drawings.

My invention relates to couplings useful in uniting or joining, in axial continuity, adjacent sections of double or jacketed conduit systems such as employed, for example, in conducting asphaltum compounds or similar viscous materials which must be maintained, by means of a suitable heating medium, in a molten or semi-fluid condition before transfer through piping may be effected.

In forms of couplings heretofore designed for jacketed conduits, it has been difficult not only to prevent cross leakage between the inner pipes of the conduit and the jacketing at the junctures of adjacent sections, but, what was exceedingly more troublesome, to ascertain the exact location of such leaks when they did occur, which, in some cases, required dismantling of the entire conduit system because the leaks were seldom apparent from the exterior. I am aware that the use of separate piping has been suggested for connecting the jackets of adjacent conduit sections which were "bridged" across the couplings at the exterior, and one of the objects of my invention is to eliminate such exterior connecting pipes.

The main object of my invention is to obviate the unsatisfactory conditions alluded to and to secure this desideratum in a coupling which is entirely self-contained, and has embodied in it, means whereby leaks may be immediately detected and their exact location ascertained.

Other subsidiary objects and attendant advantages of my invention will become readily apparent from the detailed description of a typical embodiment of my invention which follows.

In the drawings, Fig. I is an illustration partly in elevation and partly in axial section of a portion of a double or jacketed conduit at the region of juncture of two adjacent sections thereof, and showing the sections connected by a coupling conveniently embodying my invention in one form.

Fig. II is a cross section of the conduit viewed in the direction of the arrows II—II in Fig. I.

Fig. III is a view similar to Fig. II taken along the plane of the face of one of the flange members of the coupling as indicated by the arrows III—III in Fig. I.

Fig. IV is a perspective view of a gasket employed in the form of my invention illustrated in Figs. I, II and III.

Fig. V is a detail section similar to Fig. I, of a modified form of my invention, and Fig. VI is a perspective view of a gasket used in connection with the latter embodiment.

Referring first to the form of my invention illustrated in Figs. I to IV, it will be observed that the coupling comprehensively indicated at 1 comprises two flange elements or members 2, 2 which are exact counterparts of one another and fitted to the ends of adjacent sections 3, 3 of the double or jacketed conduit. After being properly attached to the conduit sections as will be hereinafter explained, the two flange members of the coupling are secured together, with a gasket interposed between their opposed faces by clamp bolts 5, 5. Said flange elements have central openings 6 which are threaded to receive the ends of the inner pipes 7 of the adjacent conduit sections 1, and also axial bosses 8 into which the ends of the outer pipes 9 of the conduit sections are screwed.

The annular interspaces or jackets 10 between the two pipes of the conduit sections are not directly continuous like the inner of said pipes but communicate through a passage 11 jointly formed by registering ducts in the flange members as clearly shown in Fig. I. Said passage comprises branches 12 which extend substantially radially of the flange members through integral lugs or protuberances 13 of the latter, and a connecting cross branch 14 extending in a direction parallel to the conduit axis. The cross branch 14 is located preferably at a distance comparatively remote from the central openings 6 of the flange members 2 so that ample surface area of the flange faces is afforded between said cross branch and the inner pipes 7 of the conduit sections for contact with the gasket 4. By this arrangement the possibility of leakage, at the regions aforesaid, is reduced to a minimum. The radial branches 12 of the passage 11 are by preference, continued to the periphery of the flange members and their outer ends closed by removable screw plugs such as conventionally represented at 15 in the drawings whereby access may be readily had to the passage in case the latter should, for any reason, become stopped or clogged.

At a point preferably midway between the central openings 6 and the cross branch 12 of the passage 11, the continuity of the faces of the flange members 2 is interrupted by narrow depressions or grooves 16. It will be observed, more especially from Fig. III, that said grooves extend crosswise of the flange faces and that their ends are open to the exterior at the periphery of the coupling. The extremities 17 of the grooves are preferably extended in directions radially of the conduit as shown, and purposely carried beyond the bolt holes directly adjacent the branch 14 of the passage with consequent amplification of effective surface area for contact with the gasket 4.

In the event of failure of the gasket 4, the existence of a leak in the coupling in the area adjacent the grooves between the flange members will be manifested by fluid discharge from the ends of the grooves. Thus in a conduit system where a multiplicity of such couplings are employed, not only can leakages be instantly detected but their exact locations ascertained as well and without necessitating dismantling of any extensive portion of the entire conduit system before the source of trouble can be found as required in instances hereinbefore noted. Moreover, by institution of means such as above described, cross leakage between the inner pipes and jackets of double conduits at the region of juncture of adjacent sections thereof is prevented since escape of fluid from either of the two or both in the area adjacent the grooves is conducted to the exterior through the grooves.

Referring now to Fig. V of the drawings, the structure there shown is generally similar to that of Fig. I, and similar reference numerals have been employed to indicate those parts which correspond. In this case it will be perceived that the grooves in the flange faces are absent but an equivalent therefor is provided by making the gasket 20 in two parts as shown in Fig. VI, so that when assembled with the other elements of the coupling an intervening channel 21 is afforded by which any leakage may find its way to the exterior as before. The division of the gasket, as will be apparent from Fig. VI, is so ordered that the channel 21 corresponds both in configuration and position to the grooves 16. However, I do not wish to confine myself to the exact configuration of the two gasket parts shown in Fig. VI, since it is obvious that the channel 21 may be of any shape desired and still accomplish the purposes set forth herein.

While I have shown and described my invention as embodied in a coupling, it is to be understood that its characteristic principles may, with attainment of advantages similar to those pointed out, be incorporated in other fittings used in double conduit systems such as T's, elbows, crosses, etc., and also in joints with valves.

Having thus described my invention, I claim:

1. A coupling for uniting adjacent sections of jacketed conduits affording a passage for communication of the jacketing of the conduit section, said passage having branches extending substantially radially of the conduit, a connecting branch extending in a direction substantially parallel to the axis of the conduit at a distance comparatively remote therefrom, and a groove in the face of the coupling for manifesting any leakage thereat.

2. A coupling for uniting adjacent sections of jacketed conduits comprising opposed flange members affording, jointly, a passage for communication of the jacketing of the conduit sections, said passage being formed by registering ducts of said flange members and comprising branches extending substantially radially of the conduit, a connecting branch extending in a direction substantially parallel to the conduit axis at a distance comparatively remote therefrom, and a groove in the face of each flange member lying between the inner conduit and the passages in the faces of the opposed flanges which communicate with the jacketing space.

3. A coupling for uniting adjacent sections of jacketed conduits affording a passage for communication of the jacketing of the conduit sections, said passage having branches extending substantially radially of the conduit to the periphery of the coupling and a connecting branch extending in a direction substantially parallel to the axis of the conduit; and removable plugs for closing the open ends of the radial branches of the passage at the periphery of the coupling.

4. A coupling for uniting adjacent sections of jacketed conduits comprising opposed flange members affording openings for communication of both the inner pipes of the conduit sections and their jacketing, communication between the jacketing being established by opposed radial passages in said flange members and connecting branches parallel to the axis of the conduit, and also, in the plane of abutment of the flange faces and at a region intermediate the openings aforesaid, a groove by aid of which the existence of leaks is manifested through fluid discharge at the exterior of the coupling.

5. A coupling for uniting adjacent sections of jacketed conduits comprising opposed flange members whereby the inner pipes of the conduit are connected in axial continuity and which affords, at a distance beyond the aligned pipes, a passage for communication of the jacketing of the conduit sections, said coupling affording also a groove in the plane of abutment of the flange faces intermediate the inner pipe of the conduit and the passage aforesaid by which the existence of leaks is manifested through fluid discharge at the exterior of the coupling.

6. A coupling for uniting adjacent sections of jacketed conduits comprising opposed flange members whereby the inner pipes of the conduit are connected in axial continuity and which affords, at a distance beyond the aligned pipes, a passage for communication of the jacketing of the conduit sections, in combination with a gasket interposed between the opposed faces of the flange members, said gasket comprising two segments which are spaced to afford between them a groove extending across the coupling intermediate the inner conduit pipe and the passage aforesaid whereby failure of the gasket is manifested through fluid discharge at the exterior of the coupling.

In testimony whereof, I have hereunto signed my name at Philadelphia, Pennsylvania, this 2nd day of November, 1921.

FRANK A. BROWNE.

Witnesses:
  JAMES H. BELL,
  E. L. FULLERTON.